Figure 1:
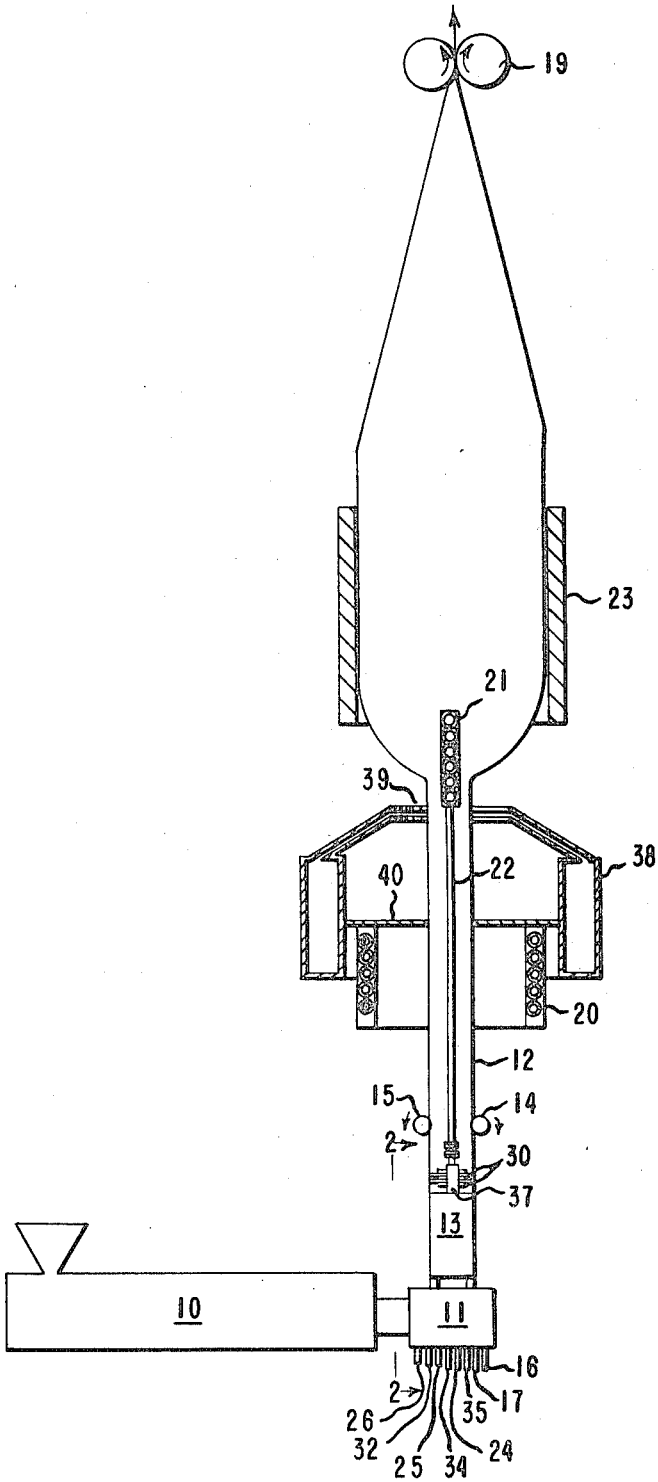
Figure 2:
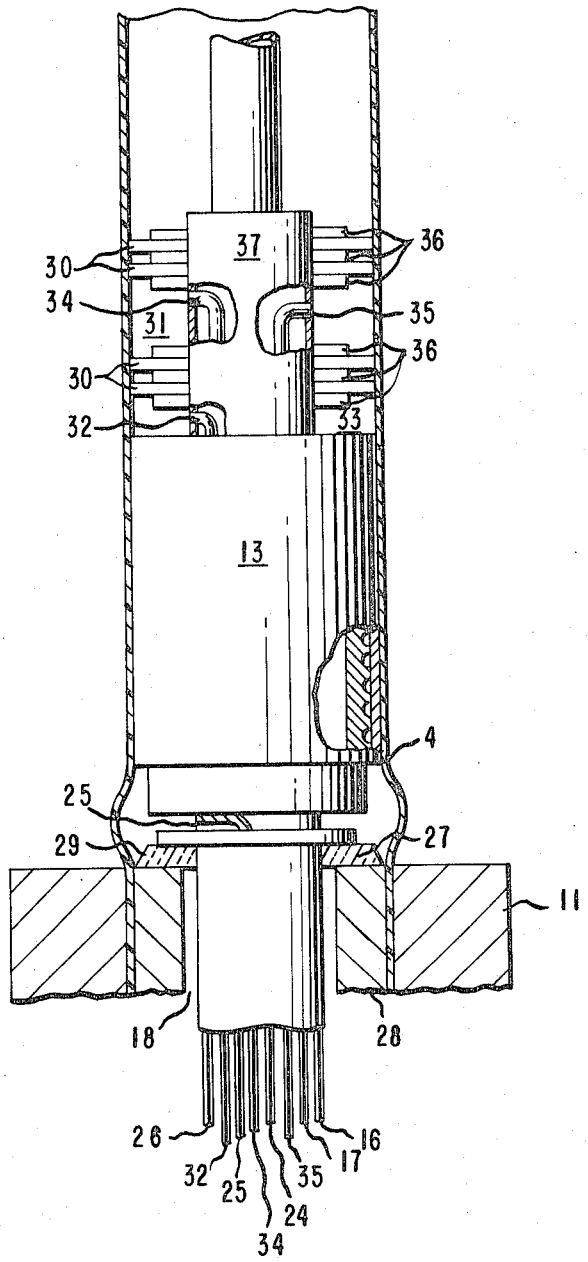

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 27, 1973

908 O.G. 789

T908,007

PROCESS AND APPARATUS FOR EXTRUDING POLYOLEFINS

Edward Joseph Moore, Tonawanda, N.Y., assignor to E. I. du Pont de Nemours and Company, Wilmington, Del.

Continuation of application Ser. No. 76,586, Sept. 29, 1970, which is a continuation of application Ser. No. 763,842, Sept. 30, 1968, both now abandoned. This application Nov. 10, 1971, Ser. No. 197,444

Int. Cl. B29d *7/20, 23/04*

U.S. Cl. 264—209

2 Sheets Drawing. 17 Pages Specification

A process for preparing tubular film structures of polyolefins which comprises melt-extruding a polyolefin polymeric material in tubular form; advancing the tubular film at a predetermined rate first over a liquid coolant medium disposed internally of such film while maintaining the liquid coolant under pressure without rupturing the film, and then over quenching means for cooling the film to a temperature below its formative state, the liquid coolant medium completely filling a space between and defined by a die member for melt-extruding the tubular film, the inner surface of the tubular film and the quenching means, the liquid coolant medium having a boiling point greater than the temperature of the die member.

The liquid coolant is polyethylene glycol, ethylene glycol, or glycerol which is disposed in a space between a die member and the quenching means and the space is maintained substantially full of the liquid coolant which has a temperature in the range between 10° C. and 45° C. The surface of the die member facing the space between the die member and the quenching means is insulated with an annular insulating tapered disc coextensive with the die core of the die member whereby contact between said liquid coolant medium and the die member is minimized and whereby contact between the disc and the inside surface of the tubular film advanced thereby also is minimized.

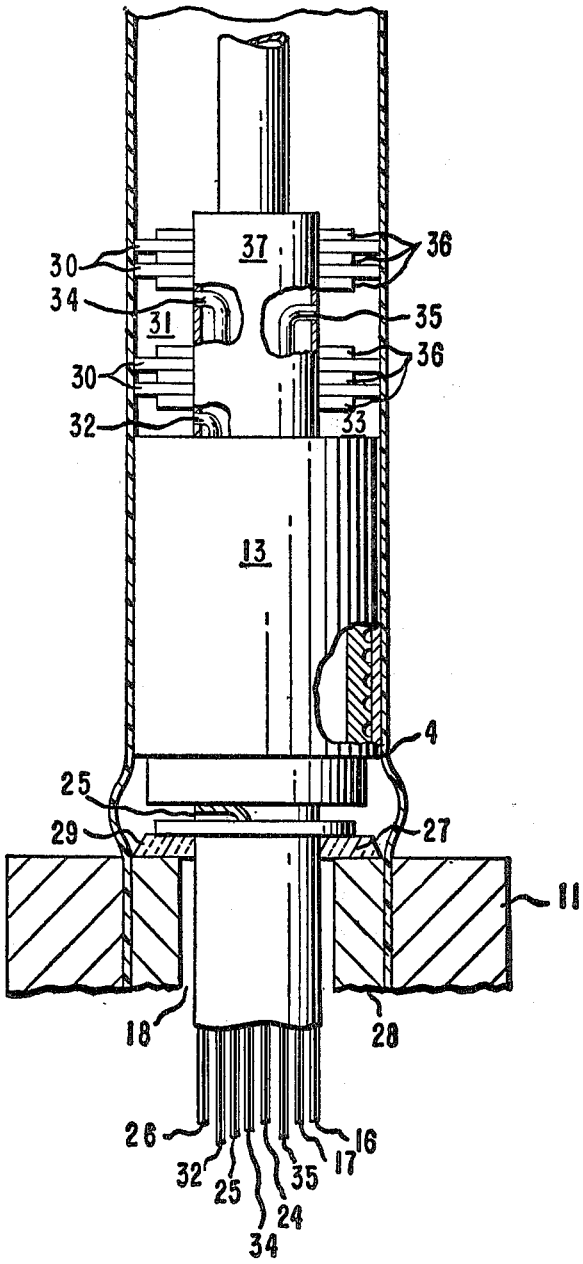

PROCESS AND APPARATUS FOR EXTRUDING POLYOLEFINS

Original Filed Sept. 30, 1968 2 Sheets-Sheet 1

INVENTOR
EDWARD JOSEPH MOORE

BY Claude L. Beaudoin
ATTORNEY

PROCESS AND APPARATUS FOR EXTRUDING POLYOLEFINS

Original Filed Sept. 30, 1968 2 Sheets-Sheet 2

INVENTOR
EDWARD JOSEPH MOORE

BY Claude L. Beaudoin
ATTORNEY